(12) United States Patent
Gupta et al.

(10) Patent No.: US 10,199,832 B2
(45) Date of Patent: Feb. 5, 2019

(54) PHOTOVOLTAIC DC POWER DISTRIBUTION SYSTEM

(71) Applicant: First Solar, Inc., Perrysburg, OH (US)

(72) Inventors: Ranjan K. Gupta, Perrysburg, OH (US); Kevin G. Collins, Perrysburg, OH (US)

(73) Assignee: First Solar, Inc., Perrysburg, OH (US)

( * ) Notice: Subject to any disclaimer, the term of this patent is extended or adjusted under 35 U.S.C. 154(b) by 351 days.

(21) Appl. No.: 15/139,604

(22) Filed: Apr. 27, 2016

(65) Prior Publication Data
US 2016/0322827 A1 Nov. 3, 2016

Related U.S. Application Data

(60) Provisional application No. 62/153,594, filed on Apr. 28, 2015.

(51) Int. Cl.
*H02J 3/38* (2006.01)
*H02M 7/44* (2006.01)
*H02M 3/04* (2006.01)

(52) U.S. Cl.
CPC ............ *H02J 3/383* (2013.01); *H02M 3/04* (2013.01); *H02M 7/44* (2013.01); *Y02E 10/563* (2013.01)

(58) Field of Classification Search
CPC .. H02J 3/383; H02J 3/38; H02M 3/04; H02M 7/44; Y02E 10/563
See application file for complete search history.

(56) References Cited

U.S. PATENT DOCUMENTS

| 8,373,303 | B1 | 2/2013 | Daniels et al. | |
|---|---|---|---|---|
| 8,680,838 | B2 | 3/2014 | Saussele | |
| 2012/0025751 | A1* | 2/2012 | Bakas | H02J 7/35 320/101 |
| 2012/0314747 | A1 | 12/2012 | Boivin et al. | |
| 2013/0043723 | A1 | 2/2013 | Daniels et al. | |
| 2013/0307342 | A1 | 11/2013 | Niemela | |

(Continued)

FOREIGN PATENT DOCUMENTS

| CN | 202004692 U | 10/2011 |
|---|---|---|
| CN | 102237823 A | 11/2011 |
| CN | 102684555 A | 9/2012 |

(Continued)

OTHER PUBLICATIONS

PCT International Search Report and the Written Opinion, Application No. PCT/US2016/029446 filed Apr. 27, 2016, dated Sep. 16, 2016.

(Continued)

*Primary Examiner* — Rexford Barnie
*Assistant Examiner* — Thai Tran
(74) *Attorney, Agent, or Firm* — MacMillan, Sobanski & Todd, LLC

(57) ABSTRACT

A photovoltaic DC power distribution system provides a DC-DC converter having an output serially connected between a photovoltaic module array and a power converter, such as an inverter, in which the input voltage to the power converter is the sum of the voltage from the array and a voltage output of the DC-DC converter. The DC-DC converter only handles a portion of the power transferred from the array to the power converter.

28 Claims, 14 Drawing Sheets

(56) References Cited

U.S. PATENT DOCUMENTS

2014/0159763 A1  6/2014  Luo et al.
2014/0176026 A1  6/2014  Saussele

FOREIGN PATENT DOCUMENTS

| CN | 202906789 U | 4/2013 |
| CN | 202906790 U | 4/2013 |
| CN | 203326921 U | 12/2013 |
| CN | 103490650 A | 1/2014 |
| CN | 103516304 A | 1/2014 |

OTHER PUBLICATIONS

Jong-Pil Lee et al., "Design and Control of Novel Topology for Photovoltaic DC/DC Converter with High Efficiency under Wide Load Ranges", Journal of Power Electronics, vol. 9 No. 2, Mar. 2009, pp. 300-307.
Jong-Pil Lee et al., "A Novel Topology for Photovoltaic DC/DC Full Bridge Converter with Flat Efficiency under Wide PV Module Voltage and Load Range", 2007 IEEE, pp. 1-8.

* cited by examiner

P_FPC → POWER FLOWING THROUGH THE FPC (FULL POWER DC-DC CONVERTER 29)

P_PPC → POWER FLOWING THROUGH THE PPC (PARTIAL POWER DC-DC CONVERTER 31)

though less advantageous over the FIGS. 2, 2A system.

PHOTOVOLTAIC DC POWER DISTRIBUTION SYSTEM

CROSS-REFERENCE TO RELATED APPLICATION

This application claims priority to U.S. Provisional Application No. 62/153,594, filed Apr. 28, 2015, which is hereby fully incorporated by reference.

FIELD OF THE INVENTION

The present invention is directed to a photovoltaic DC power distribution system in which an array of photovoltaic modules provide output power to a DC to AC inverter or another type of power conversion stage (e.g. DC/DC converter), for supplying power, for example, to a power grid.

BACKGROUND

Various techniques have been used for providing power from a photovoltaic array to a power grid. FIG. 1 illustrates one such example in which a photovoltaic (PV) array 11 formed of plural groups 12 of photovoltaic modules, supplies DC voltage to respective combiner circuits 13, each of which combines, in parallel, the outputs from the groups 12 of photovoltaic modules of the array 11. A combiner circuit 13 is also known in the art as a combiner box. The output of the combiner circuits 13 are fed on respective DC lines 14, also called DC feeders, to inverters 17 which convert the DC voltage from the photovoltaic array 11 to an AC voltage. The AC voltage from inverters 17 is stepped up at respective transformers 19 and then supplied, for example, on a medium voltage AC (MVAC) line 21, e.g. at 34 kVAC, to a combining switchgear 23. The combining switchgear combines the AC voltage output from groups of transformers 19 and applies the combined AC voltage to a substation 25 and ultimately to a power grid 27. Among many control functions, the inverters 17 may also perform a maximum power point tracking (MPPT) operation on the photovoltaic modules of array 11 to which they are connected, as known in the art.

FIG. 2 shows a simplified portion of the FIG. 1 system in which a single combiner circuit 13 and inverter 17 are shown. It particularly shows that the voltage output of groups 12 of photovoltaic modules of array 11 is supplied through the combiner circuit 13 on DC lines 14 to inverter 17 inputs. Each of the groups 12 contains a plurality of PV modules connected in series and/or parallel relationship, or may contain one single PV module. Thus, the output power from the array 11 of photovoltaic modules is supplied directly to the inverters 17 through group switches 16 of the combiner circuits 13 and through a disconnect switch 18. As shown in a further simplification in FIG. 2A, this system typically provides a variable DC voltage (e.g. VINV=900V-1500V) on the DC lines 14 input to inverter 17 which is the same voltage (e.g. VPV=VINV) as supplied by the photovoltaic modules of array 11. Inverter 17 controls the variable voltage input thereto by using an MPPT algorithm to control output power from the photovoltaic modules to which it is connected. In the example shown in FIG. 2A, the DC voltage set by inverter 17 at the terminals of a group 12 photovoltaic modules of an array can vary in the range of 900-1500V, but these values will depend on a particular implementation including output characteristics of the photovoltaic modules and design parameters of the system.

FIG. 3 illustrates a portion of another prior art arrangement in which DC-DC converters 29 are provided between groups 12 of photovoltaic modules of array 11 and combiner circuits 13 (only one such combiner circuit 13 and inverter 17 are shown in FIG. 3) and which provides a substantially fixed DC voltage on a DC line 14 (i.e. Feeder #1) input to the inverter 17. FIG. 3A shows a simplified portion of the FIG. 3 arrangement. In this arrangement the inverter 17 sets a fixed DC voltage on lines 14 (e.g. VINV=1500V (fixed) and each DC-DC converter 29 provides MPPT control over the photovoltaic modules within a group 12 to which it is connected. The photovoltaic modules of array 11 supply a variable input voltage (e.g. VPV=900V-1500V to a DC-DC converter 29 which in turn supplies a fixed voltage to the inverter 17 through the combiner circuit 13.

The FIGS. 3, 3A arrangement has advantages over that shown in FIGS. 2, 2A in that since the inverter 17 does not need to perform MPPT and the input voltage to the inverter 17 is fixed, the power density and efficiency of the inverter can be increased. However, the DC-DC converter 29 must also be able to handle the full power which is transferred from the groups 12 of photovoltaic modules of the array 11 to the inverter 17. Thus, although an inverter 17 having improved power density and efficiency can be used in this arrangement, full power DC-DC converters 29 must be provided. As shown in FIG. 3A and in the illustrated example, the output voltage PV of the array can vary in the range of e.g. 900V-1500V, but the output voltage of the DC-DC converters 29, and combiner circuits 13, and at the input to the inverters 17 is fixed at 1500V. As used herein the phrase "fixed" means providing a desired fixed voltage which may have a slight deviation from the desired fixed value caused by inherent equipment and line losses.

With respect to the system illustrated in FIGS. 1, 2, 2A the output from the PV array 11 can vary under control of the inverters 17, in a relatively wide range of output voltages. Using the example noted, the output voltage of an array 11 can be between 900V to 1500V DC. With such a system, and with the inverters 17 providing the MPPT, various inefficiencies are encountered. For example, up to 35% of the capacity of the inverters 17 is not utilized and up to 40% of the capacity (current carrying capacity) of the DC lines between the PV module groups 12 and combiner circuit 13 and the combiner circuit 13 and inverter 17 are not utilized. Stated another way, the DC lines and inverters must be designed to have a rated capacity to handle the maximum power, voltage and current swings which may occur during MPPT operation, as an example.

The FIGS. 3, 3A system provides somewhat of an improvement on the overall system efficiency since the inverters 17 operate on a fixed voltage, e.g., 1500V. Accordingly, the inverter can be fully utilized, while the capacity of the DC lines in the array and to the combiner circuit 13 and from the combiner circuit 13 to the inverter 17 are likewise fully utilized. In other words, the FIGS. 3, 3A system can be more efficient than that of FIGS. 2, 2A system, but at the expense of requiring full power capacity DC-DC converters 29, which must transport the entirety of the power from the PV module groups 12 and array 11 to the inverters 17, and which must also provide MPPT.

A large number of full power rated DC-DC converters may significantly increase the fixed and operational cost of the system and may reduce the overall system reliability. However, the inverters 17 employed in the FIG. 3, 3A system can be cost effective and more efficient than those employed in the FIG. 1, 2, 2A system since they do not have to deal with a fluctuating DC voltage or provide MPPT functionality.

What would be desirable is a system which provides a fixed voltage at the input to inverters 17, but which has lower fixed and operational cost, higher reliability and availability, and lower losses in the DC-DC converters than those employed in the system shown in FIGS. 3, 3A.

DETAILED DESCRIPTION OF THE INVENTION

The present invention is an improvement over the FIGS. 1, 2, 2A and FIGS. 3, 3A systems. It provides a fixed DC voltage on the input lines to an inverter using a partial power DC-DC converter, which has an input port A and an output port B, each formed as a pair of terminals of the DC-DC converter. The input port A is coupled across either the input lines to the inverter or the output lines of the groups a of modules of an array and the output port B is connected in a series between the output lines of groups a of photovoltaic modules and the input lines of the inverter. The DC-DC converter provides MPPT control for the group(s) of photovoltaic modules to which it is connected. The DC-DC converter does not transfer full power from the photovoltaic modules of the array to the inverter, but instead transfers a part of the power (partial power) from the photovoltaic modules of the array to the inverter. The inverter operates at a substantially fixed DC input voltage. This system therefore has advantages of providing an improved inverter, with higher power density and efficiency as mentioned earlier, while at the same time providing for a more optimal power rating of DC-DC converter and associated lower fixed and operation cost compared to the FIGS. 1, 2, 2A and 3, 3A systems. The DC-DC converter may be provided near the array or at or near a combiner circuit to provide lower cost and better utilization efficiency of DC lines running between the DC-DC converter and inverter since a substantially fixed voltage is provided on these lines.

Figure 1:
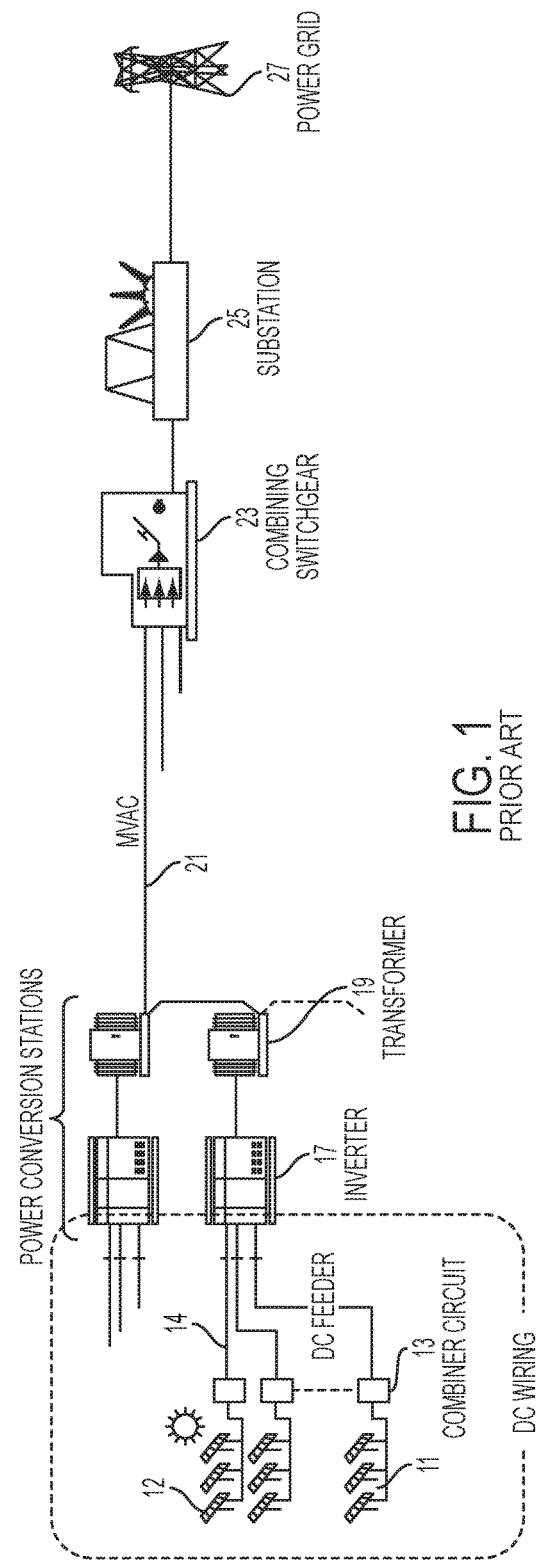
FIG. 1 illustrates an example of a conventional photovoltaic DC power distribution system.
Figure 2:
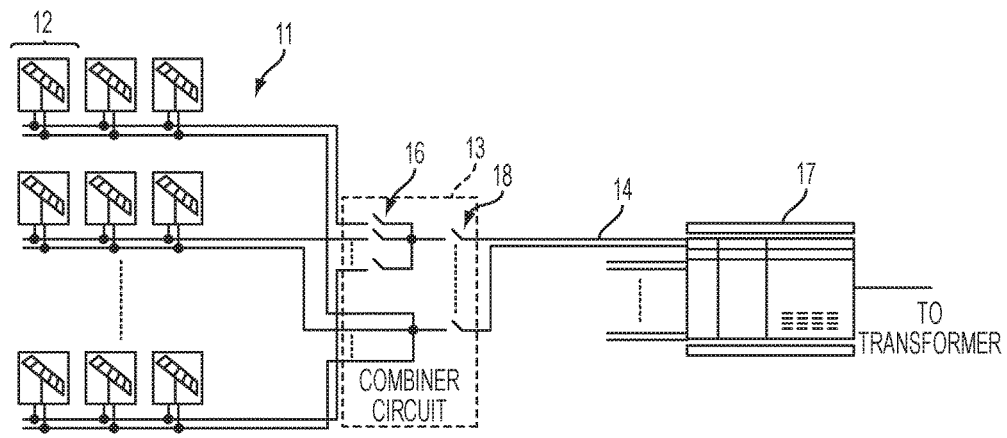
FIGS. 2 and 2A illustrate a simplification of the conventional photovoltaic DC power distribution system illustrated in FIG. 1.
Figure 2A:
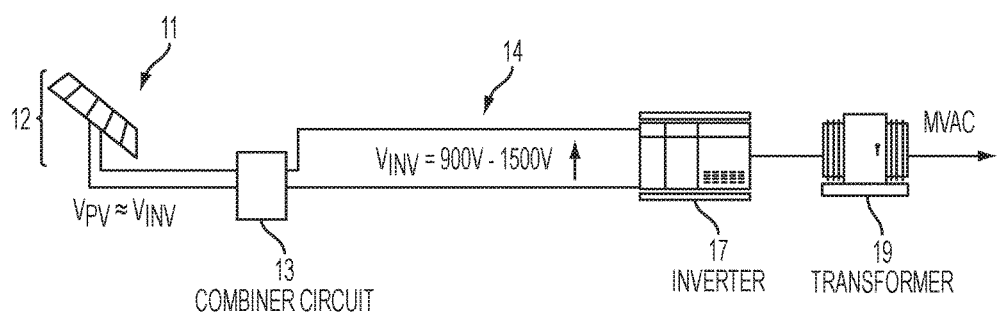
Figure 3:
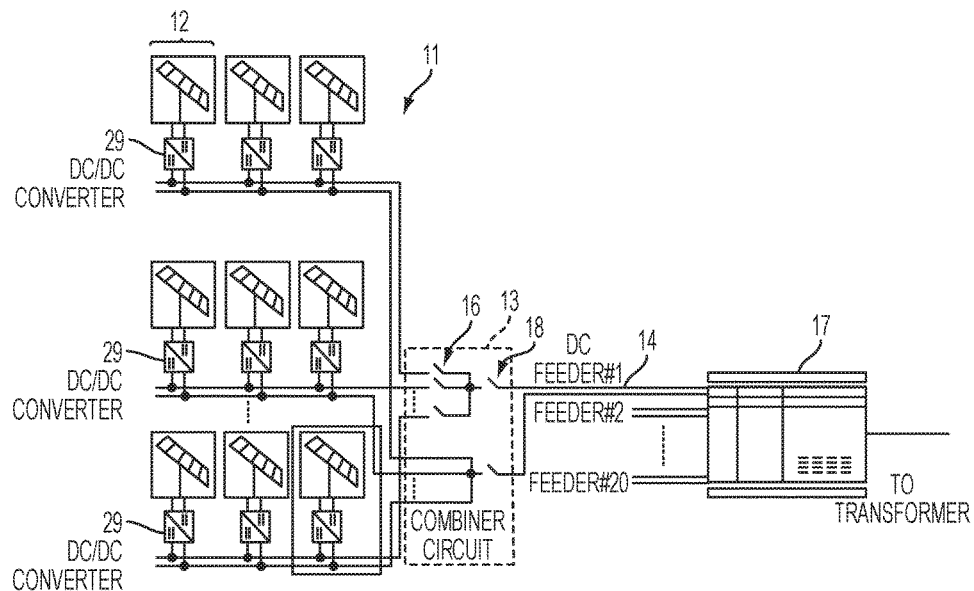
FIGS. 3 and 3A illustrate in simplified form another example of a conventional photovoltaic DC power distribution system.
Figure 3A:
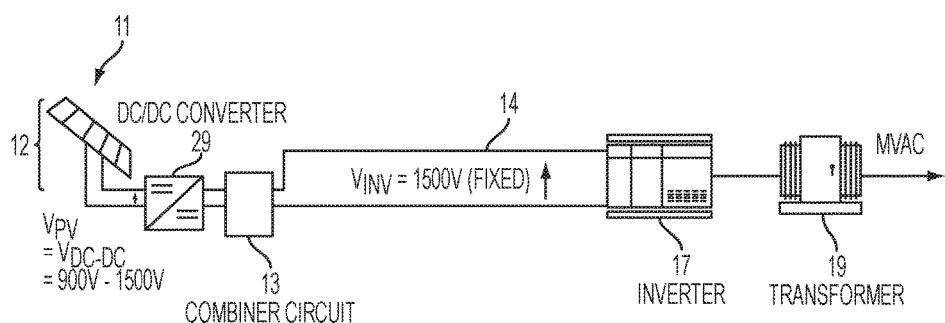
Figure 4:
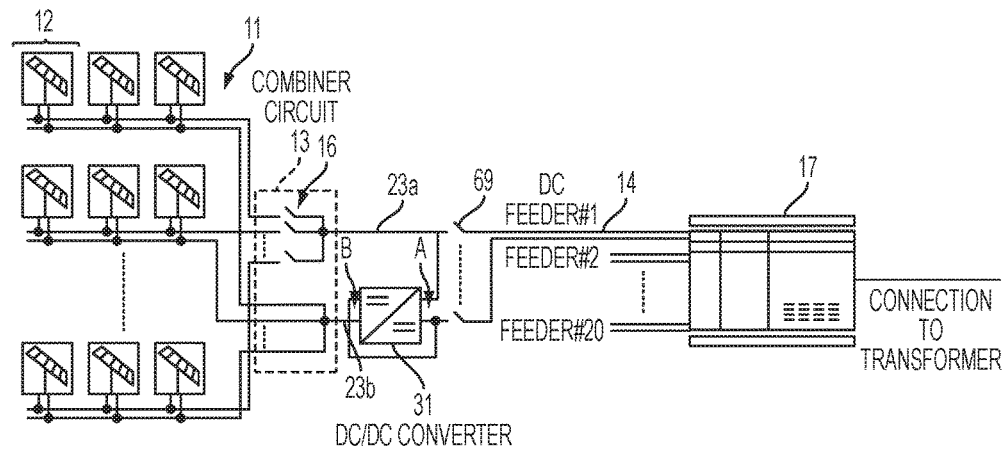
FIGS. 4 and 4A illustrate an embodiment of a photovoltaic DC power distribution system in accordance with the invention.
Figure 4A:
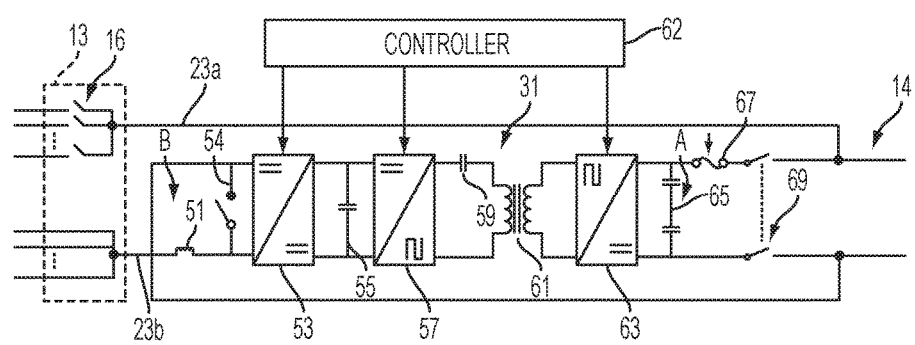

One embodiment of the invention is illustrated in FIGS. 4 and 4A. FIG. 4 shows plural groups 12 of photovoltaic modules of array 11, which are coupled to a DC line 14 and to inverter 17 through a DC-DC converter 31. Unlike the DC-DC converter 29 shown in FIGS. 3 and 3A where the input to DC-DC converter 29 is connected in parallel with the output of one or more module groups 12 and the output of DC-DC converter 29 is connected in parallel with the input of inverter 17, the DC-DC converter 31 shown in FIG. 4 has an output port B connected in series between groups 12 of photovoltaic modules of the array 11 and input lines of inverter 17. An input port A of DC-DC converter 31 is connected across a DC line 14 (e.g. Feeder #1) coupled to the input of inverter 17 which is at a fixed voltage as set by the inverter. The voltage at port B of the DC-DC converter 31 is a variable voltage, while the voltage at port A of DC-DC converter 31 is the fixed voltage at the input to the inverter 17. The DC-DC converter 31 illustrated in FIG. 4 does not carry the full power conveyed from the array 11 of photovoltaic modules to the inverter 17, as explained in examples below, and thus can be considered a partial-power DC-DC converter 31. As such, the ratings capacity of each DC-DC converter 31 is much lower than the rating capacity of each DC-DC converter 29 employed in the FIGS. 3, 3A prior art system, enabling a more efficient and improved photovoltaic DC power distribution system with significantly reduced overall power rating of the distributed DC-DC converters 31. FIG. 4 also illustrates a combiner circuit 13 between groups 12 of photovoltaic modules of array 11 and the DC-DC converter 31. The combiner circuit 13 combines outputs from various groups 12 of photovoltaic modules of array 11 into one common output which is provided to inverter 17 through the port B series connected DC-DC converter 31 and safety disconnect switches 69. The DC-DC converter 31 also provides MPPT control over the groups 12 of photovoltaic modules to which it is connected.

It should be noted that there will be many DC-DC converters 31 feeding into the illustrated inverter 17 on respective DC lines 14 and there will be a plurality of inverters 17 and associated DC-DC converters 31 for a large scale power distribution system. Thus, FIG. 4 shows one DC-DC converter 31 for a DC feeder line 14, but each feeder line 1 . . . 20, will have an associated DC-DC converter 31 and combiner circuit 13 to which groups 12 of modules are connected. In addition, the FIG. 4 system can be replicated with additional inverters 17, DC-DC converters 31, combiner circuits 13 and module groups 12 as needed for a particular installation.

The groups 12 of photovoltaic modules of array 11 may provide a variable output voltage, which when added to the series connected variable output voltage provided at port B of the DC-DC converter 31, equals the substantially fixed voltage input on the DC lines 14 to the inverter 17. In one example, if the array 11 voltage is variable in the range of 900V to 1500V, and the DC-DC converter 31 supplies a variable port B voltage in the range of +300V to −300V, then the substantially fixed voltage at the input of inverter 17, as maintained by the DC-DC converter 31, is 1200V. These are just merely example values as many other values can be chosen based on the characteristics of the photovoltaic modules of array 11, the DC-DC converter 31 and the inverter 17, some of which are described in examples below. In the system illustrated in FIGS. 4, 4A, the DC-DC converter 31 exercises MPPT control through controller 62 on the output of the photovoltaic modules of array 11 to which it is connected and thus provides many of the advantages of the prior art systems, but with DC-DC converter 31 having a fraction of the power capacity rating of the DC/DC converters 29 used in the FIG. 3, 3A system. Typically, as will be shown in examples below, the DC-DC converter 31 may operate on 33% or less of the power output from the array 11 which is transferred to inverter 17.

FIG. 4A shows in detail the construction of one example of an implementation of a DC-DC converter 31. Looking from the input port A towards the output port B, it includes a pair of smoothing capacitors 65 connected across the inputs of a DC-AC converter 63. The output of DC-AC converter 63 is fed to the input of a high frequency transformer 61 which reduces the voltage applied to it and feeds its output AC voltage through capacitor 59 to an AC-DC converter 57. The output of AC-DC converter 57 is fed to a DC-DC converter 53. The DC-DC converter 53 output port B receives at one terminal an input from line 23b of combiner circuit 13 through inductor 51 and provides an output on the other terminal of port B to an input line of inverter 17. Thus, the output port B is connected in series between the photovoltaic modules of array 11 and an inverter 17 input line. The components of DC-DC converters 31 are standard electrical components deployed in a series resonant circuit well-known in the art with electrical isolation provided by fuse 67 and disconnect switch 69. The input port A of AC-DC converter 31 is connected across the DC input lines 14 of inverter 17 through the fused disconnect switch 69. Controller 62 provides MPPT control and controls operation of one or more of DC-AC converter 63, AC-DC converter 57 and DC/DC converter 53 to effect MPPT control over the photovoltaic modules of array 11.

Figure 5:
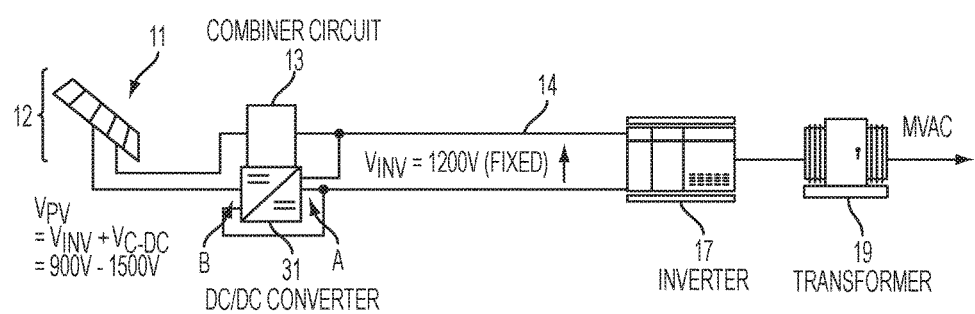
FIG. 5 illustrates another embodiment of a photovoltaic DC power distribution system in accordance with the invention.
Figure 6:
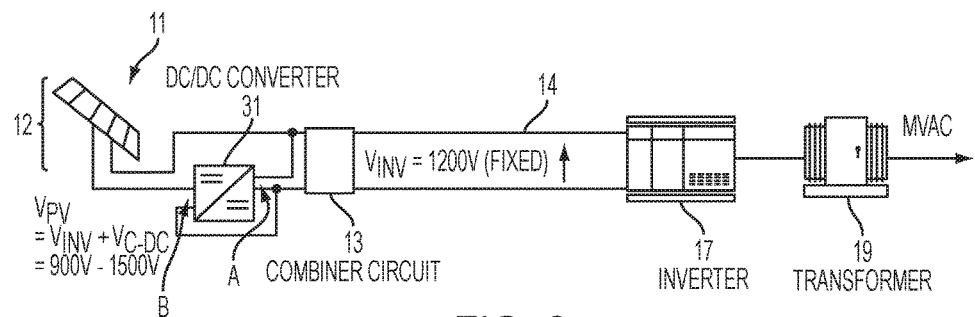
FIG. 6 illustrates another embodiment of a photovoltaic DC power distribution system in accordance with the invention.
Figure 7:
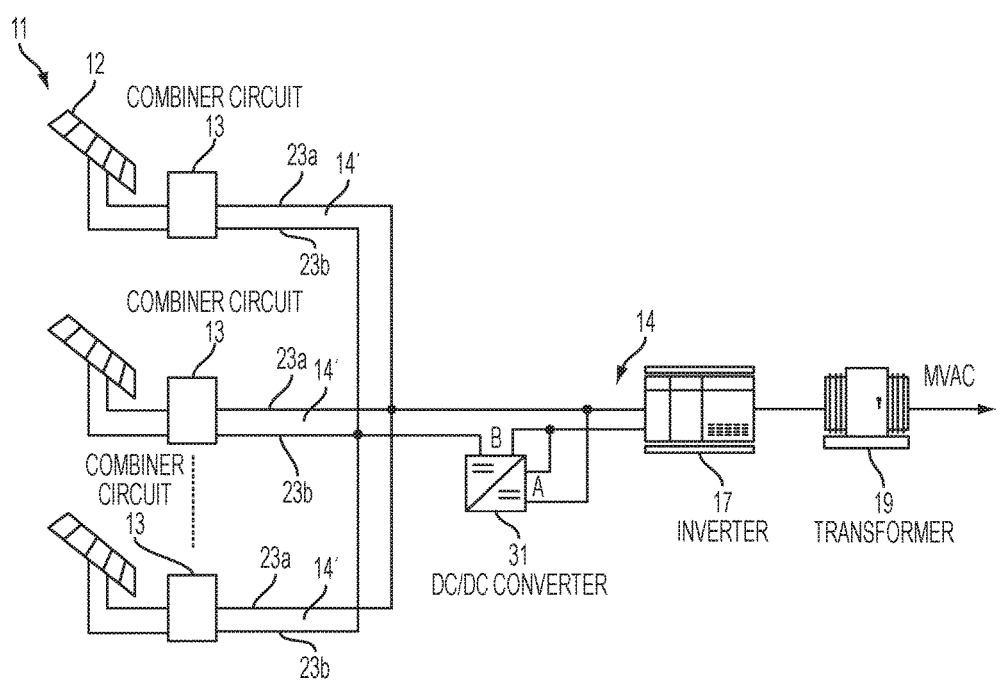
FIG. 7 illustrates another embodiment of a photovoltaic DC power distribution system in accordance with the invention.

FIGS. 4 and 4A illustrate an embodiment in which the DC-DC converter 31 is provided downstream of a combiner circuit 13, that is, between the combiner circuit 13 and inverter 17. FIG. 5 illustrates another embodiment in which the combiner circuit 13 and DC-DC converter 31 are provided at the same location. This allows more effective utilization of the often long DC lines 14 input to inverter 17. For example, the DC-DC converter 31 can be provided within the same housing as combiner circuit 13. FIG. 6 illustrates another embodiment in which the combiner circuit 13 is provided downstream of DC-DC converter 31, that is, between the DC-DC converter 31 and the inverter 17. In this embodiment, the DC-DC converter 31 may be provided at the location a group 12 of modules and may be attached to a module of a module group 12. This again allows for more effective utilization of the DC lines 14 input to the inverter 17. FIG. 7 illustrates another embodiment in which a plurality of DC lines 14' output from respective combiner circuits 13 may be combined and a single DC-DC converter 31 can be employed between the combined input DC lines 14' and the input lines 14 to the inverter 17.

FIGS. 4 and 4A show the output port B DC-DC converter 31 in series 13 with output line 23b of combiner circuit 13, but it could also instead be provided in series with the other DC line 23a at the output of combiner circuit 13. The same is true for all embodiments illustrated in FIGS. 5-7.

In each of the embodiments of FIGS. 4, 4A, 5, 6, 7, the same principle of operation is at work in that a fixed voltage is established by inverter 17 with the DC-DC converter 31 providing MPPT control over the photovoltaic modules of array 11 to which it is connected in such a way that sum of the variable array voltage and the variable output voltage of the DC-DC converter 31 at port B is equal to the substantially fixed DC input voltage to the inverter 17.

In the system illustrated in the embodiments of FIGS. 4-7 the inverter 17 capacity can be fully utilized as can the DC wiring capacity between the output B of the DC-DC converter circuit 31 and the inverter 17. Placing the DC-DC converter 31 close to the array 11 and away from the inverter 17 can result in significant efficiency and cost reduction in the DC wiring between the DC-DC converter 31 and inverter 17.

Figure 8:
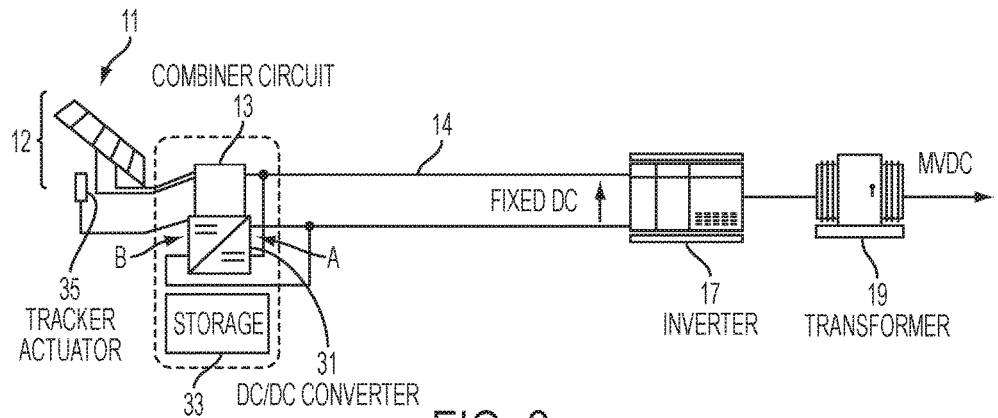
FIG. 8 illustrates another embodiment of a photovoltaic DC power distribution system in accordance with the invention.

FIG. 8 illustrates an embodiment which is a variation of the FIG. 5 embodiment and in which the DC-DC converter 31 is provided at the location of the combiner circuit 13, and which as noted, maybe in the same housing as the combiner circuit 13. In the FIG. 8 embodiment, a DC storage device 33, such as a capacitor bank, or battery storage is also provided in association with the DC-DC converter 31 for storing DC power and providing power from the storage device 33 to the input of inverter 17 when needed. The storage device 33 can be connected to the DC line 14 or to a voltage node within DC/DC converter 31 to receive and supply DC power as needed.

Figure 9:
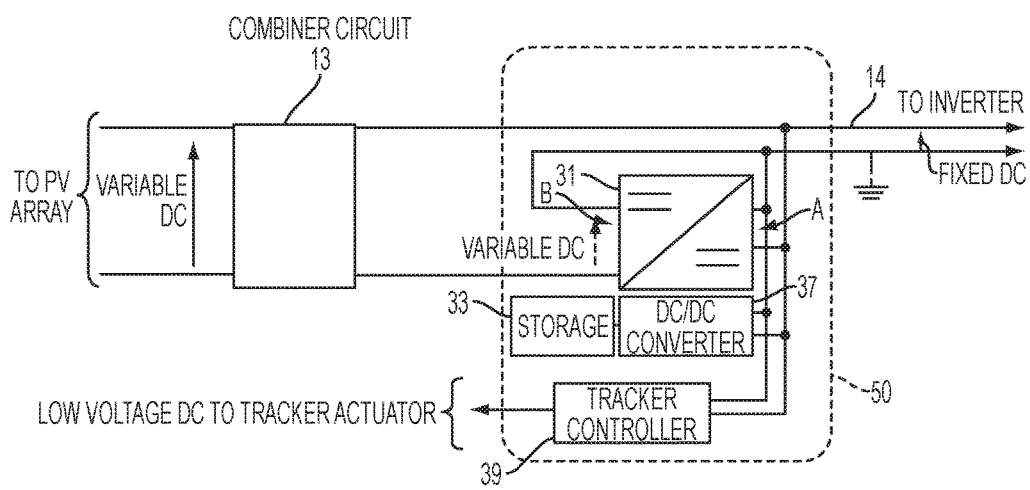
FIG. 9 illustrates in schematic form a portion of the system illustrated in FIG. 8.

FIG. 9 illustrates in greater detail one arrangement 50 of the DC-DC converter 31 and storage device 33 which may be used with combiner circuit 13 in the FIG. 8 embodiment. As shown, the input port A of the DC-DC converter 31 is connected across the fixed voltage line input lines 14 to inverter 17 and the output port B is connected serially between one line of the output of combiner circuit 13 and a DC line to inverter 17. FIG. 9 also shows a bi-directional DC-DC converter 37 for converting the input voltage to the DC-DC converter 31 at port A to a DC voltage for storage device 33 and for converting output voltage of the storage device 33 to a DC voltage for input to inverter 17 when needed.

Although FIG. 9 illustrates an embodiment in which a DC/DC converter 37 is provided between the input A of DC-DC converter 31 and storage device 33, the input of DC-DC converter 37 can be supplied from an internal DC voltage point within DC-DC converter 31 and may be omitted altogether if there is an internal voltage within DC-DC converter 31 which corresponds to the voltage of storage device 33. In another variant, the storage device 33 may also be directly connected to the DC line 14, assuming the voltages are compatible.

FIG. 8 also shows a tracker actuator 35 coupled to a group 12 of photovoltaic modules of array 11. As well known in the art, a tracker actuator provides movement, usually rotational movement, of a table containing a plurality of photovoltaic modules to track, for example, the position of the sun as it moves from one horizon to another. FIG. 8 illustrates that a combined circuitry of the combiner circuit 13, DC-DC converter 31, and storage device 33 can also provide an output to the tracker actuator 35. This is further illustrated in FIG. 9 in the form of a tracker controller 39, which receives as an input the input voltage at port A of the DC-DC converter 31 and provides lower voltage DC control signal to the tracker actuator 35. The tracker controller 39 may also obtain its input voltage from an internal DC voltage point of DC/DC converter 31 instead of being connected to DC line 14.

Figure 10:
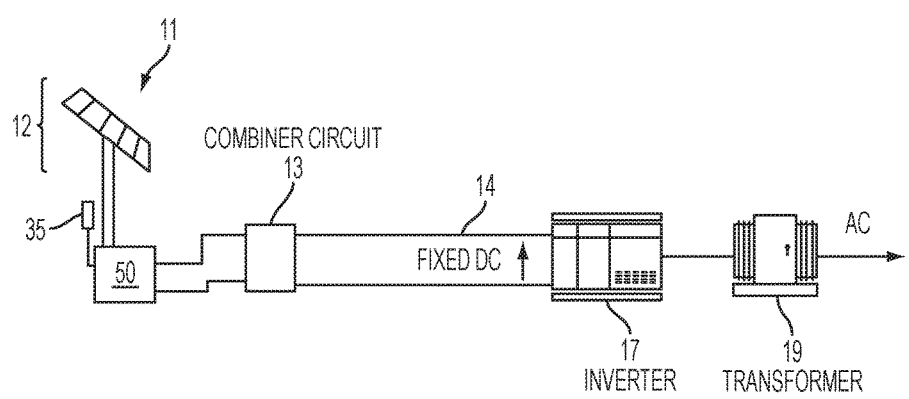
FIG. 10 illustrates another embodiment of a photovoltaic DC power distribution system in accordance with the invention.

In the FIG. 8 embodiment, the combiner box 13, DC-DC converter 31, and storage device 33 are provided between the groups 12 of photovoltaic modules of array 11 and the inverter 17. In another embodiment, illustrated in FIG. 10, the DC-DC converter 31, storage device 33, and tracker controller 39, illustrated in FIG. 9, are all provided at the location of the array 11 of photovoltaic modules and can be integrated as combined circuit 50 at the location of tracker actuator 35. In this embodiment, the combiner circuit 13 is provided between the group 12 of photovoltaic modules of array 11, at which the tracker actuator 35, DC-DC converter 31, storage device 33, and tracker controller 39 are provided, and the inverter 17.

Figure 11:
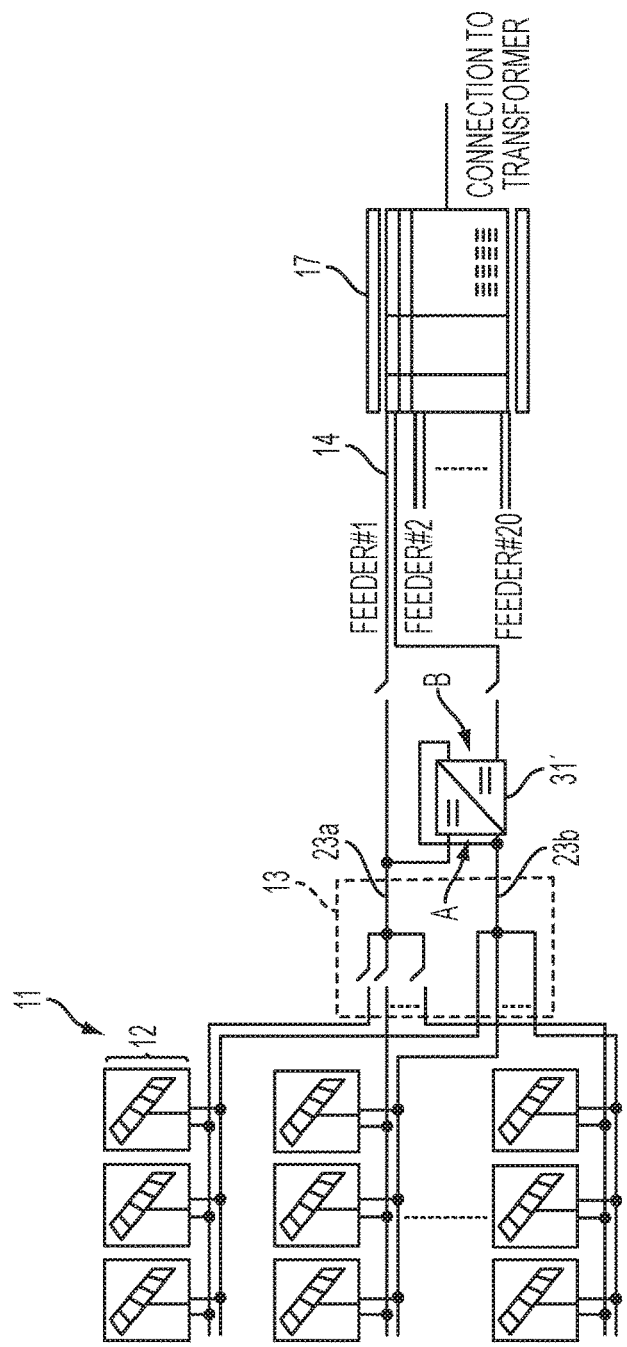
FIGS. 11 and 11A illustrate another embodiment of a photovoltaic DC power distribution system in accordance with the invention.
Figure 11A:
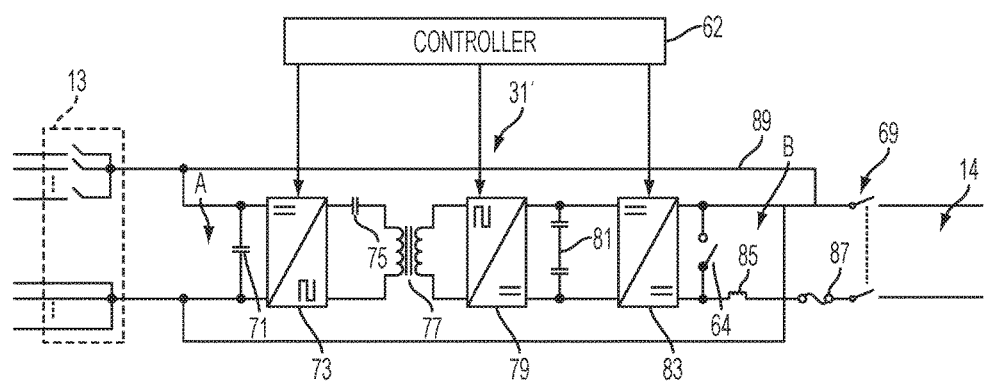

In the various embodiments illustrated above, input port A of the DC-DC converter 31 is connected across the input to inverter 17 and the output port B of the DC-DC converter 31 is provided in series between the groups 12 of photovoltaic modules and inverter 17. However, as shown in FIGS. 11 and 11A the input port A of DC-DC converter 31 can also be connected across DC lines 23*a*, 23*b* which provide the variable voltage output of the groups 12 of photovoltaic modules, and the output port B connected in series between the groups 12 of photovoltaic modules and the DC line 14 input of inverter 17. In this instance, the variable DC voltage of the groups 12 of photovoltaic modules, which are under MPPT control of the DC-DC converter 31', provide the input voltage to the DC-DC converter 31' which in turn provides an output voltage in series with that of the groups 12 of photovoltaic modules and inverter 17, such that the sum of the variable output voltage of the groups 12 of photovoltaic modules and the variable voltage at output of port B of DC-DC converter 31' equals the fixed input voltage to inverter 17. It should be noted that the arrangement of the DC-DC converter 31' input port A shown in FIG. 11 can be employed as a substitute for the DC-DC converter 31 in each of the embodiments shown in FIGS. 4-10 described above. Also, although FIG. 11 shows the output B of DC-DC converter 31' connected in series with DC line 23*b*, it instead could be connected in series with DC line 23*a*.

FIG. 11A illustrates one example of the internal construction of DC-DC converter 31'. It includes an input capacitor 71 provided at input port A across an input to a DC-AC converter 73, the output of which is provided through series capacitor 75 along a step down high frequency AC transformer 77. The output of transformer 77 is supplied to an AC-DC converter 79. The output of AC-DC converter 79 is smoothed by series connected capacitors 81 and supplied to a DC-DC converter 83 which provides the variable output voltage at port B through an inductor 85. The output of inductor 85 is connected, together with line 89 from combiner circuit 13 as the input to inverter 17 on DC line 14 through fuse 87 and disconnect switch 69. A controller 62 controls operation of one or more of the DC-AC converter 73, AC-DC converter 79 and DC-DC converter 83 to provide MPPT control over the photovoltaic modules of array 11.

The embodiments described above show use of a DC-DC converter 31 (or 31') on a two-wire DC line feeder system. However, the DC-DC converter 31 (or 31') can also be used with a three or four wire DC bipole line feeder system.

Figure 12:
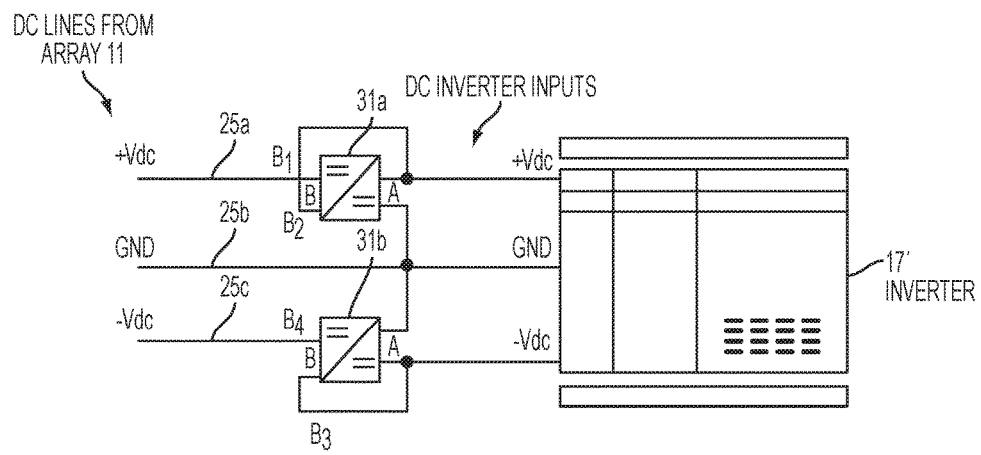
FIG. 12 illustrates another embodiment of a photovoltaic DC power distribution system in accordance with the invention.
Figure 13:
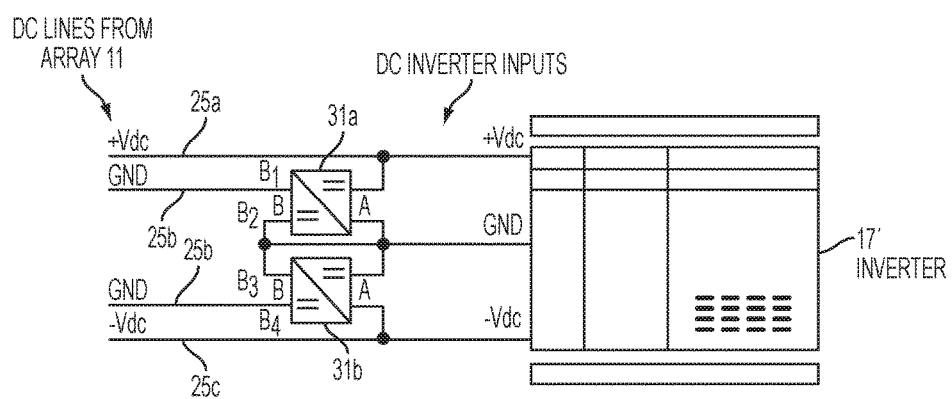
FIG. 13 illustrates another embodiment of a photovoltaic DC power distribution system in accordance with the invention.

FIG. 12 illustrates an embodiment in which two DC-DC converters 31*a* and 31*b* have their input ports A respectively connected across +Vdc and ground (GND) and −Vdc and ground (GND) input lines to a three line inverter 17'. The output port B (terminals B1 and B2) of DC-DC converter 31*a* is connected in series between a +Vdc output line of array 11 and the +Vdc input line to inverter 17'. Similarly, the output port B (terminals B3 and B4) of DC-DC converter 31*b* is connected in series between a −Vdc output line of array 11 and the −Vdc input line to inverter 17'. FIG. 12 shows the output ports B of the DC-DC converters 31*a* and 31*b* connected in series with the PV module array lines 25*a* and 25*c*. FIG. 13 illustrates an array 11 four DC wire embodiment where the output ports B (terminals B1 and B2) (terminals B3 and B4) of the DC-DC converters 31*a*, 31*b* are respectively connected in series between the array ground lines 25*b* and the ground (GND) line input to inverter 17'.

Figure 14:
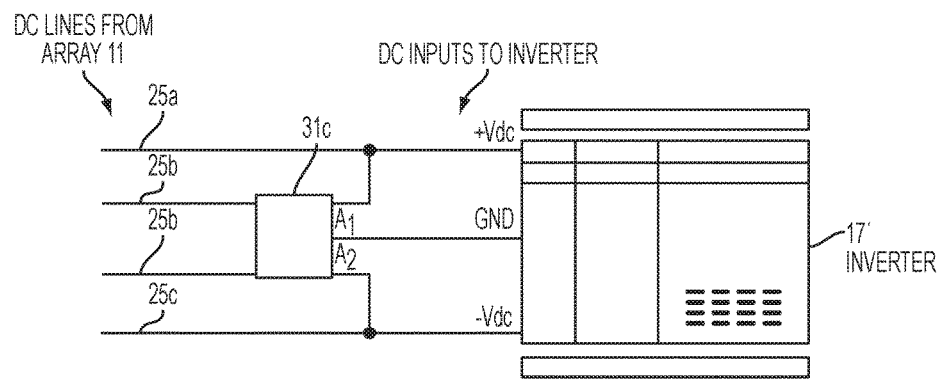
FIG. 14 illustrates another embodiment of a photovoltaic DC power distribution system in accordance with the invention.

FIG. 14 illustrates an embodiment similar to FIG. 13, but in which the two DC-DC converters 31*a*, 31*b* are combined into a single dual DC-DC converter 31*c*. The two DC-DC converters 31*a*, 31*b* shown in FIG. 12 can also be combined into a single dual DC-DC converter.

Figure 15:
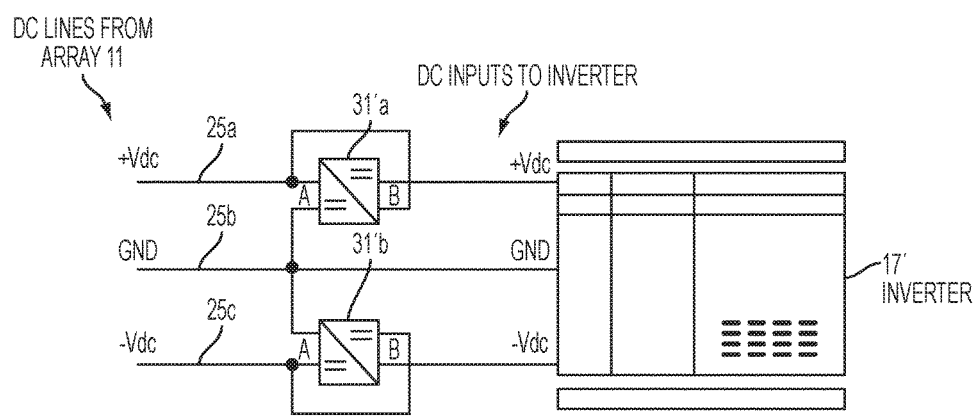
FIG. 15 illustrates another embodiment of a photovoltaic DC power distribution system in accordance with the invention.

FIG. 15 illustrates an embodiment for use in a three wire DC bipole system in which the input ports A of the DC-DC converters 31'*a* and 31'*b* are respectively connected to one of the array +Vdc, −Vdc voltage lines and the ground line of array 11. The output port B of DC-DC converter 31'*a* is connected in series between +Vdc line of the array 11 and +Vdc input line of inverter 17'. The output port B of DC-DC converter 31'*b* is connected in series between −Vdc line of array 11 and −Vdc input line of inverter 17'.

Figure 16:
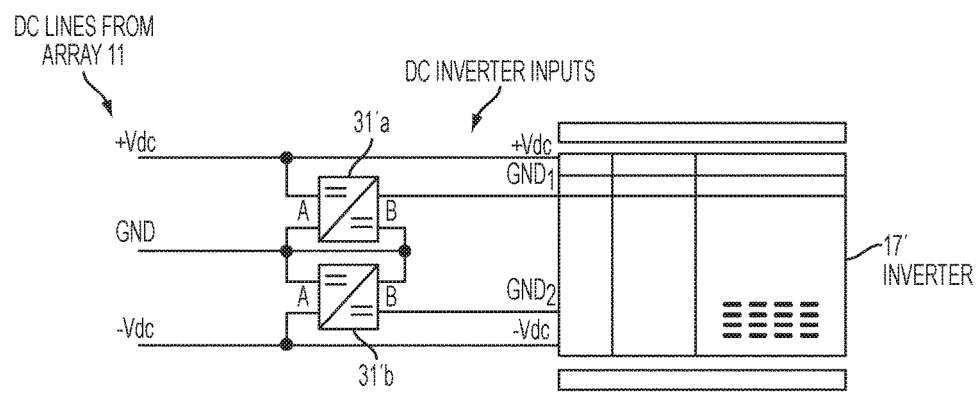
FIG. 16 illustrates another embodiment of a photovoltaic DC power distribution system in accordance with the invention.

FIG. 16 illustrates an embodiment for use in a three array wire DC bipole system with a four wire inverter 17' input. In this embodiment the input port A of DC-DC converter 31'*a* is connected across the +Vdc, and ground (GND) array 11 lines, while the output port B is connected in series between the ground array line GND, and the ground input line $GND_1$ to inverter 17'. FIG. 16 also shows DC-DC converter 31'*b* with an input port A connected across the −Vdc and ground line GND of array 11 and output port B connected in series between the array ground line GND and ground input line $GND_2$ to inverter 17'.

Figure 17:
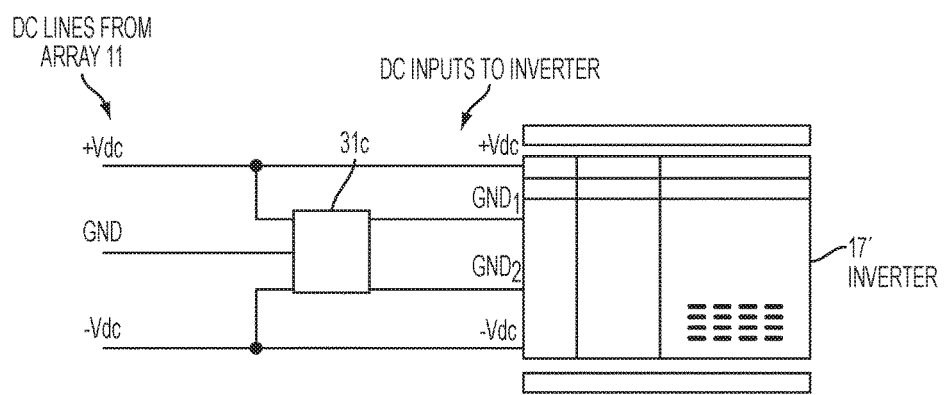
FIG. 17 illustrates another embodiment of a photovoltaic DC power distribution system in accordance with the invention.

FIG. 17 shows an embodiment similar to FIG. 16, but in which the two DC-DC converters 31'*a* and 31'*b* are combined into a single dual DC-DC converter 31'*c*. A combined single dual DC-DC converter 31*c* can also be employed for the FIG. 15 embodiment.

The DC-DC converter 31 (31') of the invention may also employ a bypass switch which disables its operation when certain conditions exist within a photovoltaic power plant. The bypass switch may be employed to bridge across the B output port and thereby provide a direct connection between the DC voltage lines of the array and input lines to the inverter, without the addition or subtraction of a DC voltage from DC-DC converter 31 (31') output port B. FIGS. 4A and 11A show an example of a bypass switch 54 (FIG. 4A) and 64 (FIG. 11A) which can be used in various embodiments. For those embodiments which employ a 3 line D path between the array 11 and inverter 17' one bypass switch can be provided across the respective B outputs of the DC-DC converters 31a (31a'), 31b (31b').

While many operating conditions of a PV power plant containing DC-DC converter 31 (31') can be used to trigger a closing of the bypass switch (54, 64) such conditions may include, but are not limited to, any fault inside the DC-DC converter 31 (31') which may be detected by a control and protection circuit of the converter which may be employed as part of controller 62 (FIGS. 4A, 11A). Such control and protection circuit could protect against, e.g. semiconductor, transformer, or other device failure or overcurrent or over voltage conditions. In addition, the bypass switch (54, 64) can be closed by an intentional bypass command from a central power plant controller, from the DC-AC inverter 17 (17'), or from any other control system, such as controller 62. Bypass protection can also be enabled in the event of sensed severe transient conditions at input port A or output port B.

When the DC-DC connector 31 (31') is operated in the bypass mode, the inverter (17, 17') to which it is connected can be operated in a limited DC voltage control mode to harness as much power as possible from the inverter (17, 17') while the bypass is in effect.

Figure 18:
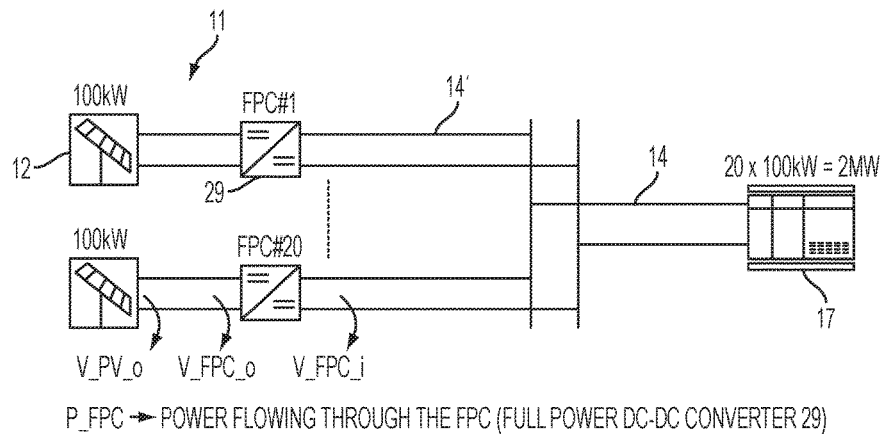
FIG. 18 illustrates in simplified form example voltage signals at various points in the FIGS. 3, 3A DC photovoltaic power distribution system; and, FIG. 19 illustrates in simplified form example voltage signals at various points in the photovoltaic DC power distribution system in accordance with embodiments of the invention.
Figure 19:
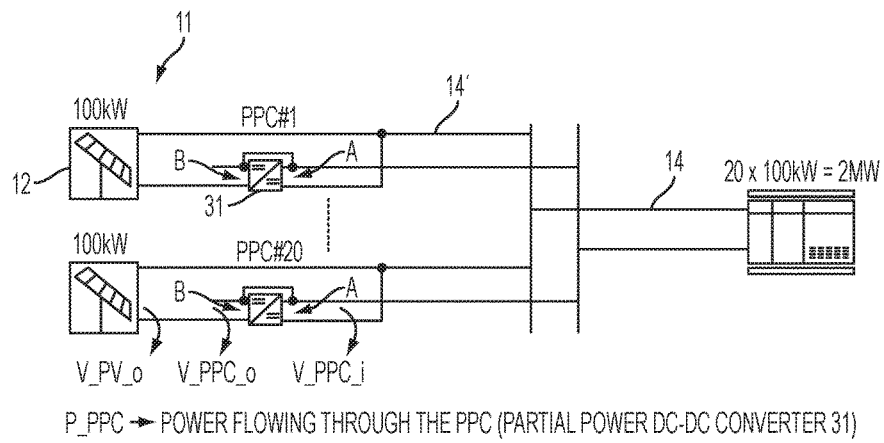

The benefits of the various embodiments of the invention can be illustrated by the simplified schematic diagrams illustrated in FIG. 18, which, represents the FIGS. 3, 3A prior art system, and FIG. 19, which represents the various embodiment of the present invention. In both, and as one example, the power flowing through the system from a group 12 of photovoltaic modules of array 11 to an inverter 17 on a DC line 14' is 100 kW. FIGS. 18 and 19 also show, as an example, an inverter 17 which handles 20 groups 12 of photovoltaic modules, each group providing 100 kW of power to inverter 17. FIGS. 18 and 19 also show the outputs from the different groups 12 of photovoltaic modules being combined prior to input to inverter 17. The inverter 17 thus receives 20×100 kW=2 MW of power.

Referring to FIG. 18, the voltages provided at the output of each group 12 of photovoltaic modules of the array 11, at the output port of the DC-DC converter 29, and on the DC voltage lines 14' and 14 between the DC-DC converter 29 and inverter 17 are respectively illustrated in FIG. 12 as V_PV_o, V_FPC_o, and V_FPC_i. The power flowing through each DC-DC converter 29 is indicated as P_FPC. Similarly, referring to the FIG. 19 voltage provided at the output of the array 11, the output voltage of port B of DC-DC converter 31 and on the voltage lines 14 between the DC-DC converter 31 and inverter 17 are respectively illustrated in FIG. 13 as VPV_o, V_PPC_o and V_PPC_i. The power flowing through each DC-DC converter 31 is indicated as PPPC.

Referring first to FIG. 18 and Table 1, as one example, the value of V_PV_o varies between 900V and 1500V DC (only example values of V_PV_o of 900V, 1000V, 1200V and 1500V are illustrated in the Table). The FIG. 18 system further uses an MPPT control range of 900V to 1200V; and has a 1500V open circuit voltage for the group 12 of modules. The FIG. 18 system also employs a fixed 1500V input to the inverter 17. With these parameters, the corresponding values of V_FPC_o, V_FPC_i, and P_FPC for the FIG. 3, 3A system are illustrated. The power losses in the DC-DC converter 29 and DC wiring are ignored for brevity.

TABLE 1

| V_PV_o | V_FPC_o | V_FPC_i | P_FPC |
|---|---|---|---|
| 900 V | 900 V | 1500 V | 100 kW |
| 1000 V | 1000 V | 1500 V | 100 kW |
| 1200 V | 1200 V | 1500 V | 100 kW |
| 1500 V | 1500 V | 1500 V | 0 kW |

As can be seen, the power P_FPC flowing through the DC-DC converter 29 is the same 100 kW of power that flows between the module groups 12 of array 11 and inverter 17, ignoring the power losses in the DC-DC converter 29 and DC wiring.

Turning to FIG. 19 and Table 2 below similar parameters are shown for the group 12 of photovoltaic modules in embodiments employing the DC-DC converters 31 (31') of the invention. Thus, the module group 12 power is at 100 kW and the module group 12 voltage fluctuates between 900V-1500 VDC with an MPPT control range of 900V to 1200V, and with a 1500V open circuit voltage for the group 12 of modules. In this instance, the voltage applied to the inverter is fixed at 1200V and the output voltage V_PPC_o at port B of the DC-DC converter 31 (or 31') varies between −300V and +300V in order to maintain the fixed 1200V on the input lines to inverter 17. Thus, the corresponding values of V_Po, V_PPCo, V_PPCi and P_PPC are as follows.

TABLE 2

| V_PV_o | V_PPC_o | V_PPC_i | P_PPC |
|---|---|---|---|
| 900 V | −300 V | 1200 V | 33 kW |
| 1000 V | −200 V | 1200 V | 20 kW |
| 1200 V | 0 V | 1200 V | 0 kW |
| 1500 V | +300 V | 1200 V | 0 kW |

The actual power flowing through the DC-DC converter 31 (P_PPC) is also illustrated for each of the values of the array output voltage V_PV_o. As can be seen, the power flowing through the DC-DC converter 31(31') is a fraction, in this example at most 33%, of the power which flows through the DC-DC converter 29 illustrated in FIG. 18 and Table 1. As a consequence, the rating and capacity of the DC-DC converter 31 (31') is a fraction of that required for the DC-DC converter 29 (FIG. 18) for the same amount of power 100 kW which is transferred between the groups 12 of photovoltaic modules and inverter 17.

As noted, the actual values utilized in implementing a system in accordance with the various embodiments of the invention can be different. Table 3, for example, illustrates another example of the embodiments of the invention represented by the FIG. 19 system in which a group 12 of photovoltaic modules of array 11 again provides 100 kW of power and an output voltage which varies in the range of 900V-1500V, with an MPPT control range of 900V to 1200V and with a 1500V open circuit voltage of the group 12 of modules, but in this instance the output voltage of the DC-DC converter 31 (or 31') varies within the range of −200V to +400V and a substantially fixed voltage of 1100 V is supplied at the inverter 17 input.

TABLE 3

| V_PV_o | V_PPC_o | V_PPC_i | P_PPC |
|---|---|---|---|
| 900 V | −200 V | 1100 V | 22.3 kW |
| 1000 V | −100 V | 1100 V | 10 kW |
| 1200 V | +100 V | 1100 V | 8.3 kW |

TABLE 3-continued

| V_PV_o | V_PPC_o | V_PPC_i | P_PPC |
|---|---|---|---|
| 1500 V | +400 V | 1100 V | 0 kW |

Again, the power, P_PPC, actually flowing through the DC-DC converter 31 is but a fraction, e.g. at most 22.3%, of that flowing through the DC-DC converter 29 employed in the FIGS. 3, 3A prior art system.

Table 4 below shows yet another example of using yet another substantially fixed voltage of 1050V at the input to the inverter 17 in embodiments of the invention. The fixed input voltage to the inverter, is maintained by the output of DC-DC converter 31 (31'), with an array power of 100 kW and array output voltage varying in the range of 900V-1500V with an MPPT control range of 900V to 1200V. The array modules 12 again have a 1500V open circuit voltage in this example. The output voltage at port B of the DC-DC converter 31 (31') varies in the range of −150V to +450V.

TABLE 4

| V_PV_o | V_PPC_o | V_PPC_i | P_PPC |
|---|---|---|---|
| 900 V | −150 V | 1050 V | 16.7 kW |
| 1000 V | −50 V | 1050 V | 5 kW |
| 1200 V | +150 V | 1050 V | 12.5 kW |
| 1500 V | +450 V | 1050 V | 0 kW |

Again, the power P_PPC flowing through each DC-DC converter 31 (31') is a fraction, e.g. at most 16.7%, of that which flows through each DC-DC converter 29 illustrated in the FIG. 3, 3A prior art system.

Table 5 shows another example in which the results of using DC-DC converters 31 (31') having an output voltage at port B which varies between 0V and +600V and which provides a substantially fixed voltage of 900V to inverter 17.

TABLE 5

| V_PV_o | V_PPC_o | V_PPC_i | P_PPC |
|---|---|---|---|
| 900 V | 0 V | 900 V | 0 kW |
| 1000 V | +100 V | 900 V | 10 kW |
| 1200 V | +300 V | 900 V | 25 kW |
| 1500 V | +600 V | 900 V | 0 kW |

Once again, the power flowing through the DC-DC converter 31 (31') is only a fraction, e.g. at most 25%, of that flowing through the DC-DC converter 29 of the FIGS. 3, 3A system.

Although embodiments of the invention described above use, as an example, an array output voltage varying between 900V-1500V under MPPT control by the DC-DC converter 31 (31'), embodiments of the invention can also be employed with higher voltage arrays 11. Table 6, for example, illustrates one example of the FIGS. 3, 3A prior art system for transferring a 100 kW from a module group 12 of array 11 in which the module group voltage varies between 1300V and 2000V. Here an MPPT control range of 1300V to 1700V is used with a 2000V open circuit voltage of the group 12 of modules, and with the fixed voltage to the inverter at 2000V. The operating parameters are as follows.

TABLE 6

| V_PV_o | V_FPC_o | V_FPC_i | P_FPC |
|---|---|---|---|
| 1300 V | 1300 V | 2000 V | 100 kW |
| 1400 V | 1400 V | 2000 V | 100 kW |
| 1700 V | 1700 V | 2000 V | 100 kW |
| 2000 V | 2000 V | 2000 V | 0 kW |

Again, the power P_FPC flowing through each DC-DC converter 29 is the full system power of 100 kW.

Table 7 below illustrates the same PV array 11 having a group 12 module voltage with varies between 1300V and 2000V, but employing embodiments of the invention with DC-DC converter 31 (or 31') supplying an output voltage between −200V and +500V, and with a substantially fixed inverter voltage of 1500V. The power flowing through the DC-DC converter 31 (31') is again a fraction e.g. at most 15.3%, of that flowing through the DC-DC converter 29 of the FIGS. 3, 3A system.

TABLE 7

| V_PV_o | V_PPC_o | V_PPC_i | P_PPC |
|---|---|---|---|
| 1300 V | −200 V | 1500 V | 15.3 kW |
| 1400 V | −100 V | 1500 V | 7.1 kW |
| 1700 V | +200 V | 1500 V | 11.7 kW |
| 2000 V | +500 V | 1500 V | 0 kW |

As shown in the representative examples in Tables 1-7, the power flowing through the DC-DC converter 31 (or 31') is less than the total power flowing between the PV array 11 and inverter 17 in the conventional system illustrated in FIGS. 3, 3A, thereby permitting a reduced overall power rating of the various components required in a photovoltaic DC power distribution system leading to higher power density of components, better capacity utilization, and potential cost reduction.

While various embodiments of the invention have been described and illustrated, it is apparent that many modifications can be made without departing from the spirit and scope of the invention. For example, although disclosed embodiments are shown for use with an inverter 17 acting as a power conversion stage, they can also be employed with another power conversion stage such as a DC/DC power conversion stage in place of the inverter 17, or with a DC/DC power conversion stage placed between the DC-DC converter 31 (31') and the inverter 17. Also, as described above and illustrated with various examples, the numeric values of the various voltages in the examples and embodiments described above can be changed to accommodate different characteristics of the photovoltaic modules in array 11, the inverter 17 and the DC-DC converter 31. Accordingly, the values used are merely examples and not limiting of the invention in any respect.

What is claimed as new and desired to be protected by Letters Patent of the United States is:

1. A photovoltaic power distribution system comprising:
   a plurality of photovoltaic modules providing a DC voltage on at least one set of DC voltage lines;
   an inverter comprising DC input lines and AC output lines for converting DC power to AC power;
   at least one DC-DC converter arranged between the at least one set of DC voltage lines and the DC input lines of the inverter,
   the at least one DC-DC converter comprising an input port and an output port, wherein the input port is connected to one of the at least one set of DC voltage lines or the DC input lines of the inverter, and the output port connects the DC-DC converter in series between the plurality of photovoltaic modules and the inverter by the at least one set of DC voltage lines and the DC input lines of the inverter, such that a sum of the DC voltage provided by the plurality of photovoltaic modules on the at least one set of DC voltage lines and the DC voltage provided by the output port of the at least one DC-DC converter equals a fixed DC voltage provided at the DC input lines of the inverter, whereby only a portion of power transferred from the plurality of photovoltaic modules to the inverter flows through the DC-DC converter.

2. The system as in claim 1, wherein the input port of the DC-DC converter is connected to the at least one set of DC voltage lines.

3. The system as in claim 1, wherein the input port of the DC-DC converter is connected to the DC input lines of the inverter.

4. The system as in claim 1, further comprising a DC combiner circuit for combining the DC voltage from the plurality of photovoltaic modules into a common output, the DC combiner circuit providing the common output on the at least one set of DC voltage lines.

5. The system as in claim 4, wherein the DC combiner circuit is provided between the plurality of photovoltaic modules and the DC-DC converter.

6. The system as in claim 4, wherein the DC-DC converter is provided at a location of the DC combiner circuit.

7. The system as in claim 6, wherein the DC-DC converter is located within a housing of the DC combiner circuit.

8. The system as in claim 1, further comprising a DC combiner circuit, wherein the DC-DC converter is provided between the plurality of photovoltaic modules and the DC combiner circuit, and a common output of the DC combiner circuit is connected to the DC input lines of the inverter.

9. The system as in claim 1, wherein the DC-DC converter provides a maximum power point tracking for the plurality of photovoltaic modules.

10. The system as in claim 1, wherein the plurality of photovoltaic modules provides a varying DC voltage on the at least one set of DC voltage lines and the output port of the DC-DC converter provides a varying DC output voltage.

11. The system as in claim 10, wherein the plurality of photovoltaic modules provides the varying DC voltage within a first range of values and the DC-DC converter supplies the varying DC output voltage within a second range of values such that the sum of a voltage value within the first range and second range equals the fixed DC voltage at the DC input lines of the inverter.

12. The system as in claim 1, wherein the DC-DC converter is located at the plurality of photovoltaic modules.

13. The system as in claim 1, further comprising a DC storage device associated with the at least one DC-DC converter for receiving and storing a voltage.

14. The system as in claim 13, wherein the storage device is provided at a location of the DC-DC converter.

15. The system as in claim 14, further comprising a DC combiner circuit for combining outputs from the plurality of photovoltaic modules and wherein the DC-DC converter and the storage device are provided at the location of the DC combiner circuit.

16. The system as in claim 1, further comprising one or more tracker actuators for moving the plurality of photovoltaic modules and a tracker actuator controller for controlling movement of the one or more tracker actuators, wherein the DC-DC converter, and tracker actuator controller are provided at a location of the one or more tracker actuators.

17. The system as in claim 1, further comprising a DC combiner circuit provided between the DC-DC converter and the DC input lines of the inverter.

18. The system as in claim 1, wherein a DC output voltage of the DC-DC converter maintains the fixed DC voltage at the DC input lines of the inverter over varying DC voltages on the at least one set of DC voltage lines.

19. The system as in claim 1, further comprising one or more tracker actuators for moving the plurality of photovoltaic modules, and an actuator controller for controlling movement of the one or more tracker actuators, wherein the actuator controller receives an input DC voltage from the DC input lines of the inverter or from the DC-DC converter.

20. The system as in claim 19, wherein the at least one DC-DC converter and actuator controller are provided at a location of a tracker actuator.

21. The system as in claim 1, further comprising:
a plurality of sets of DC voltage lines,
a plurality of DC input lines to the inverter, and
a plurality of DC-DC converters, wherein at least one DC-DC converter is arranged between the DC input lines to the inverter and a respective set of DC voltage lines from the plurality of photovoltaic modules.

22. The system as in claim 1, wherein the plurality of photovoltaic modules provide the DC voltage on a plurality of sets of DC voltage lines, and the DC voltage output on the plurality of sets of DC voltage lines are combined on a common DC line and the DC-DC converter is connected between the common DC line and the DC input lines of the inverter.

23. The system as in claim 1, wherein the at least one set of DC voltage lines comprises at least one set of three DC lines, including a +Vdc line, a −Vdc line, and a ground line, and the inverter comprises a +Vdc input line, a −Vdc input line, and a ground input line.

24. The system as in claim 23, wherein the DC-DC converter and a second DC-DC converter are provided between the at least one set of three DC lines and the inverter, the input port of the DC-DC converter being connected across the +Vdc and ground input lines of the inverter and the output port of the DC-DC converter being connected in series between one of the +Vdc and ground lines and a corresponding +Vdc and ground input line of the inverter, the input port of the second DC-DC converter being connected across the −Vdc and ground input lines to the inverter and the output port of the second DC-DC converter being connected in series between one of the −Vdc and ground lines of the three DC lines and a corresponding −Vdc and ground input line of the inverter.

25. The system as in claim 23, wherein the DC-DC converter and a second DC-DC converter are provided between the at least one set of three DC lines and the inverter, the input port of the DC-DC converter being connected across the +Vdc and ground lines and the output port of the DC-DC converter being connected in series between one of the +Vdc and ground lines and a corresponding +Vdc and ground input line of the inverter, the input port of the second DC-DC converter being connected across the −Vdc and ground lines and the output port of the second DC-DC converter being connected between one of the −Vdc and ground lines and a corresponding −Vdc and ground input line of the inverter.

26. The system as in claim 1, further comprising a controllable switch for shunting across the output port of the DC-DC converter.

27. A photovoltaic power distribution system comprising:
a plurality of photovoltaic modules providing a DC voltage on at least one set of DC voltage lines;
an inverter, comprising DC input lines and AC output lines, for converting DC power to AC power; and
a DC-DC converter arranged in a DC path between the plurality of photovoltaic modules and the inverter, wherein the DC-DC converter has an output port comprising a first output terminal and a second output terminal wherein the first output terminal is connected to at least one DC voltage line of the set of DC voltage lines and the second output terminal is connected to at least one DC input line, thereby connecting the output port in series between the plurality of photovoltaic modules and the inverter, the DC-DC converter having a DC input port comprising a first input terminal and a second input terminal, wherein the first input terminal and the second input terminal are connected across one of: the at least one set of DC voltage lines or the DC input lines of the inverter, such that a sum of the DC voltage provided by the plurality of photovoltaic modules on the at least one set of DC voltage lines and the DC voltage provided by the output port of the at least one DC-DC converter equals a fixed DC voltage provided at the DC input lines of the inverter; and
wherein only a portion of power transferred from the plurality of photovoltaic modules to the inverter flows through the DC-DC converter.

28. A photovoltaic power distribution system comprising:
a plurality of photovoltaic modules providing a DC voltage on at least one set of DC voltage lines;
a voltage converter comprising DC input lines and AC output lines for converting DC power to AC power;
a DC-DC converter arranged between the at least one set of DC voltage lines and the DC input lines of the voltage converter, the DC-DC converter comprising an input port and an output port, wherein the input port is connected to one of the at least one set of DC voltage lines or the DC input lines of the voltage converter, and the output port comprises a first terminal connected to an input from at least one line of the set of DC voltage lines and a second terminal that provides an output to at least one DC input line of the voltage converter thereby connecting the output port in series between the plurality of photovoltaic modules and voltage converter, such that a sum of the DC voltage provided by the plurality of photovoltaic modules on the at least one set of DC voltage lines and at least one DC voltage provided by the output port of the DC-DC converter equals a fixed DC voltage provided at the DC input lines of the voltage converter.

* * * * *